United States Patent
DeRoo et al.

(10) Patent No.: US 8,100,240 B2
(45) Date of Patent: *Jan. 24, 2012

(54) CONTROL SYSTEM AND METHOD FOR CONTROLLING AN OPERATIONAL MODE OF A VEHICLE VIA MULTIPLE CLUTCH ASSEMBLIES

(75) Inventors: Chris Alan DeRoo, Charlotte, NC (US); Larry Dean Swanson, Horicon, WI (US)

(73) Assignee: Deere & Company, Moline, IL (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/559,805

(22) Filed: Sep. 15, 2009

(65) Prior Publication Data
US 2009/0326772 A1    Dec. 31, 2009

Related U.S. Application Data

(62) Division of application No. 11/500,040, filed on Aug. 7, 2006, now Pat. No. 7,611,004.

(51) Int. Cl.
*F16D 27/12* (2006.01)
*B60K 6/20* (2007.10)

(52) U.S. Cl. ......... 192/48.2; 903/914; 903/946

(58) Field of Classification Search .......... None
See application file for complete search history.

(56) References Cited

U.S. PATENT DOCUMENTS

| | | | |
|---|---|---|---|
| 3,387,689 A | 6/1968 | Ovshinsky | |
| 4,335,429 A | 6/1982 | Kawakatsu | |
| 4,986,377 A | 1/1991 | Moriarty | |
| 6,705,416 B1 | 3/2004 | Glonner et al. | |
| 6,722,458 B2 | 4/2004 | Hofbauer | |
| 6,887,180 B2 | 5/2005 | Pels et al. | |
| 7,173,344 B2 | 2/2007 | Yang | |
| 7,431,113 B2 | 10/2008 | Deppe | |
| 7,611,004 B2 * | 11/2009 | DeRoo et al. | 192/48.2 |
| 2006/0247086 A1 | 11/2006 | Watanabe et al. | |

OTHER PUBLICATIONS

Electromagnetic Clutches, Electromagnetic Brakes, Product Brochure [online], Lenze, GmbH & Co KG, retrieved Aug. 7, 2006, 31 pages. www.lenzeusa.com/bpdf/405677cb.pdf.

* cited by examiner

*Primary Examiner* — Rodney Bonck
(74) *Attorney, Agent, or Firm* — Yee & Associates, P.C.; Dawn C. Wolff

(57) ABSTRACT

A first clutch assembly has an active state for transmitting rotational energy and an inactive state for not transmitting rotational energy. A generator has a generator shaft associated with the first clutch assembly. A second clutch assembly has an active state for transmitting rotational energy and an inactive state for not transmitting rotational energy. A transmission has a transmission shaft directly or indirectly associated with the second clutch assembly. A third clutch assembly has an active state for transmitting rotational energy and an inactive state for not transmitting rotational energy. An engine has an engine shaft associated with the third clutch assembly. A controller establishes an operational mode of the vehicle by controlling the states of the first clutch assembly, the second clutch assembly, and the third clutch assembly.

20 Claims, 5 Drawing Sheets

CONTROL SYSTEM AND METHOD FOR CONTROLLING AN OPERATIONAL MODE OF A VEHICLE VIA MULTIPLE CLUTCH ASSEMBLIES

This application is a divisional of application Ser. No. 11/500,040, filed Aug. 7, 2006 now U.S. Pat. No. 7,611,004, status allowed.

FIELD OF THE INVENTION

This invention relates to a control system for a vehicle and a method for controlling an operational mode of a vehicle via multiple clutch assemblies.

BACKGROUND OF THE INVENTION

In a series hybrid configuration, a hybrid vehicle may have an internal combustion engine for providing rotational energy to a generator. In turn, the generator converts the rotational energy into electrical energy for one or more drive motors to propel the vehicle. In a parallel hybrid configuration, both the internal combustion engine and an electric drive motor may apply rotational energy to one or more wheels (or tracks associated with wheels) to propel the vehicle. Thus, there is a need to have a single vehicle that can operate in the series hybrid configuration or the parallel hybrid configuration.

SUMMARY OF THE INVENTION

A control system for a vehicle and a method for controlling the operational mode of a vehicle comprise a group of clutch assemblies. A first clutch assembly has an active state for transmitting rotational energy and an inactive state for not transmitting rotational energy. A generator has a generator shaft associated with the first clutch assembly. A second clutch assembly has an active state for transmitting rotational energy and an inactive state for not transmitting rotational energy. A transmission has a transmission shaft directly or indirectly associated with the second clutch assembly. A third clutch assembly has an active state for transmitting rotational energy and an inactive state for not transmitting rotational energy. An engine has an engine shaft associated with the third clutch assembly. A controller establishes an operational mode of the vehicle by controlling the states of the first clutch assembly, the second clutch assembly, and the third clutch assembly.

DESCRIPTION OF THE PREFERRED EMBODIMENTS

Figure 1:
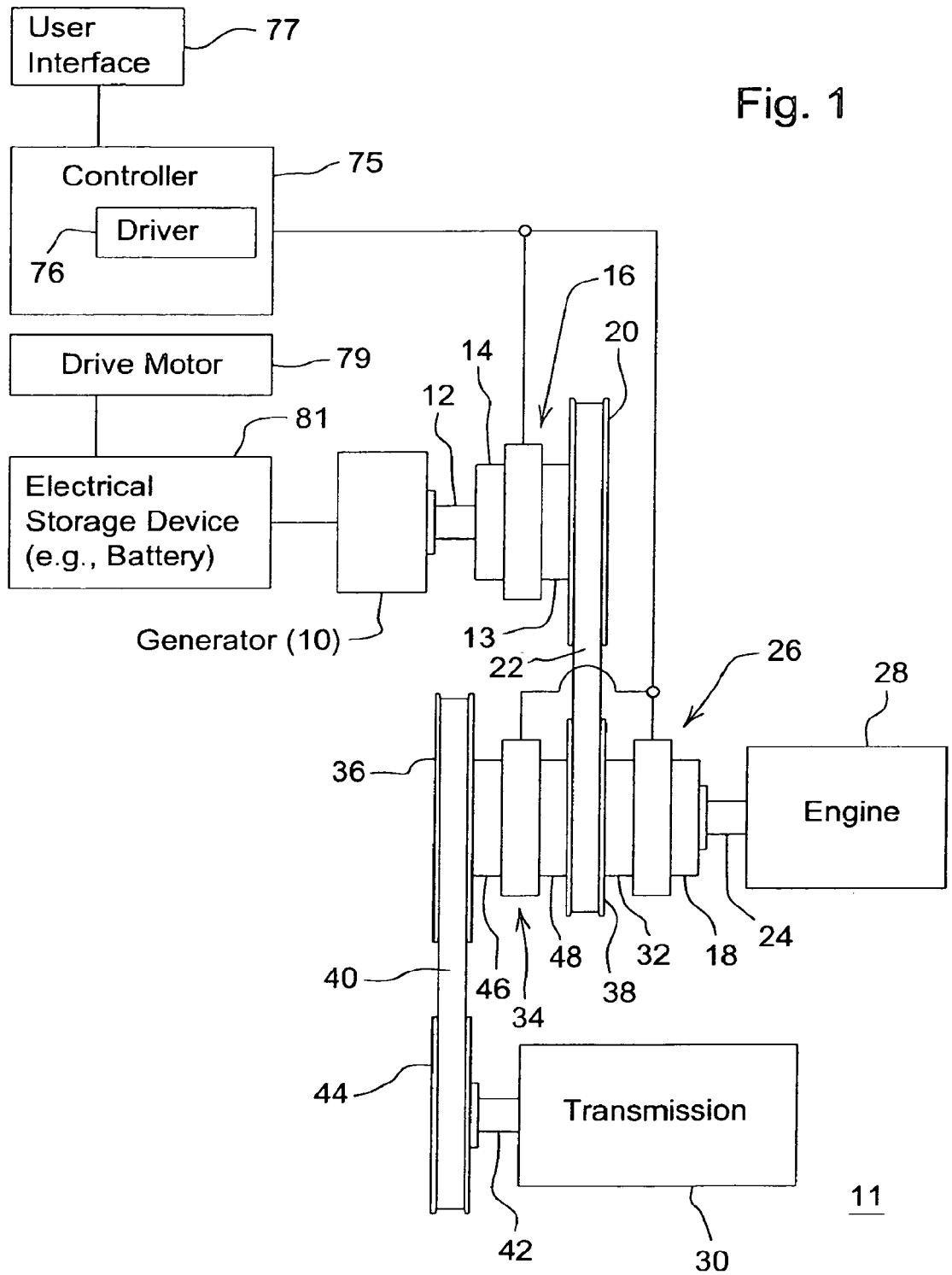
FIG. 1 is a diagram of a first embodiment of a control system for a vehicle.

In accordance with one embodiment, FIG. 1 shows a control system 11 for a vehicle having multiple clutch assemblies (16, 26, and 34). The control system 11 comprises a first clutch assembly 16 associated with a generator shaft 12 of a generator 10. A second clutch assembly 34 is associated directly or indirectly with a transmission shaft 42 of a transmission 30. A third clutch assembly 26 is associated with an engine shaft 24 (e.g., crankshaft) of an engine 28. The first clutch assembly 16, the second clutch assembly 34, and third clutch assembly 26 have electrical, optical, or databus connections to a controller 75. In one embodiment, the first clutch assembly 16, the second clutch assembly 34, and the third clutch assembly 26 each comprise electromagnetic clutches. The controller 75 establishes an operational mode of the vehicle by controlling the states of the first clutch assembly 16, the second clutch assembly 34, and the third clutch assembly 26 via one or more control signals.

A user interface 77 is coupled to the controller 75 for providing user or operator input to the controller 75. The user interface 77 may comprise a switch (e.g., associated with a dashboard, a control panel, a pedal, or a lever of a vehicle), a display, a keypad, a keyboard, a pointing device (e.g., an electronic mouse) or another device for entering data (e.g., mode selection data) into the controller 75. In one embodiment, the user interface 77 supports a user entering in control data to select an operational mode (e.g., parallel hybrid operational mode or a series hybrid operational mode) for the control system 11. The driver 76 may generate suitable control signals or control data for controlling the states of each clutch assembly. The electrical output of a generator 10 may be connected or coupled to an electrical storage device 81 (e.g., a battery), a drive motor 79, or another electrical load. As shown in FIG. 1, the generator 10 provides electrical energy to an energy storage device 81, which in turn is coupled to a drive motor 79 for propelling a vehicle.

In one embodiment, each clutch assembly (16, 26, and 34) comprises an electromagnetic clutch that has a stationary electromagnet, a rotor, and an armature. In one embodiment, the armature is composed of iron, steel, or another ferrous alloy or structure. The stationary electromagnet may be formed by one or more windings, with or without a ferrous (e.g., iron) core. During an active state of a clutch assembly, electrical energy (e.g., electrical current) is applied to the electromagnet which magnetizes the rotor and magnetically attracts the armature axially toward the rotor such that the armature and rotor contact each other at a friction interface for generally synchronous rotation together. During an inactive state, electrical energy is withdrawn from the electromagnet such that a spring or magnetic bias of a permanent magnet may return the armature to a rest state spaced apart from the rotor by an axial air gap. The rotor is associated with an input member, and the armature is associated with an output member, or vice versa. In one configuration, each input member or output member may comprise a hub or other coupling member adapted to receive a shaft, for instance.

In one embodiment, the first clutch assembly 16 may comprise an electromagnetic clutch that has first input member 13 and a first output member 14. The first clutch assembly 16 has an active state in which rotational energy is transmitted (or transferred) between the first input member 13 and the first output member 14 and an inactive state in which rotational energy is not transmitted between the first input member 13 and the first output member 14. As illustrated in FIG. 1, the first input member 13 is connected to the first cylindrical member 20 and the first output member 14 is coupled to the generator shaft 12. Accordingly, during the active state rotational energy is transmitted between the first cylindrical member 20 and the generator shaft 12.

In one embodiment, the second clutch assembly 34 may comprise an electromagnetic clutch that has a second input member 48 and a second output member 46. The second clutch assembly 34 has an active state in which rotational energy is transmitted between the second input member 48 and the second output member 46 and an inactive state in which rotational energy is not transmitted between the second input member 48 and the second output member 46. As illustrated in FIG. 1, the second input member 48 is coupled to the third cylindrical member 38 and the second output member 46 is coupled to a second cylindrical member 36 or a transmission shaft 42. Accordingly, during the active state rotational energy is transmitted between the third cylindrical member 38 and the transmission shaft 42.

In one embodiment, the third clutch assembly 26 may comprise an electromagnetic clutch that has a third input member 18 and a third output member 32. The third clutch assembly 26 has an active state in which rotational energy is transmitted between the third input member 18 and the third output member 32 and an inactive state in which rotational energy is not transmitted between the third input member 18 and the third output member 32. As illustrated in FIG. 1, the third input member 18 is coupled to the engine shaft 24 and the third output member 32 of the third clutch assembly 26 is mechanically coupled to the second input member 48 (of the second clutch assembly 34) or the third cylindrical member 38. Accordingly, during the active state rotational energy is transmitted between the engine shaft 24 and the third output member 32 or the third cylindrical member 38.

The controller 75 may support operation of the control system 11 or its components, in one or more of the following modes: a series hybrid mode, a parallel hybrid mode, a stationary power generation mode, a conventional internal combustion engine mode, or any other mode described herein. The controller 75 may comprise a driver 76 that provides a suitable control signal for energizing an electromagnet of one or more clutch assemblies (16, 34, and 26). In an alternative embodiment, the driver may provide a digital control signal or analog control signal to the one or more clutch assemblies (16, 34, and 26) equipped with a control circuitry.

A first operational mode means an operational mode in which the engine 28 supplies rotational energy to the generator 10 for power generation (i.e., electrical energy generation or alternating current or direct current power) where the controller generates control signals such that the first clutch assembly 16 is active, the second clutch assembly 34 is inactive, and the third clutch assembly 26 is active. The first operational mode may support a series hybrid operation or stationary power generation for application to an external electrical load.

A second operational mode means an operational mode in which the engine 28 supplies rotational energy to the transmission 30 where the controller 75 generates control signals such that the first clutch assembly 16 is inactive, the second clutch assembly 34 is active, and the third clutch assembly 26 is active. The second mode may represent a conventional internal combustion engine mode without generator operation.

A third operational mode means an operational mode in which propulsion may be provided by rotational energy from the engine 28 and by rotational energy from a motor coupled to the generator 10 where the controller generates control signals such that the first clutch assembly 16 is active, the second clutch assembly 34 is active, and the third clutch assembly 26 is active. The third operational mode represents a parallel hybrid mode.

In the configuration of FIG. 1, the first input member 13 is connected to a first cylindrical member 20 (e.g., first pulley); the second output member 46 is connected to a second cylindrical member 36 (e.g., a second pulley) or coupled to transmission shaft 42; and the third output member 32 is connected to a third cylindrical member 38 (e.g., a third pulley). Further, a first tension member 22 (e.g., first belt) engages the first cylindrical member 20 (e.g., first pulley) and the third cylindrical member 38 (e.g., third pulley) to facilitate simultaneous rotation of the first cylindrical member 20 and the third cylindrical member 38; a second tension member 40 (e.g., second belt) engages the second cylindrical member 36 (e.g., second pulley) and the fourth cylindrical member 44 (e.g., fourth pulley) to support simultaneous rotation of the third pulley and the fourth pulley.

The cylindrical members (20, 38, 36, and 44) may comprise pulleys, gears, sprockets, cogged wheels, or otherwise. The first tension member 22 may comprise a belt, a cogged belt, a chain or a cable. Similarly, the second tension member 40 may comprise belt, a cogged belt, a chain or a cable. If the cylindrical members (20, 38, 36, and 44) comprise gears or sprockets; the tension members may comprise chains that rotationally couple the first cylindrical member 20 to the third cylindrical member 38 and rotationally couple the second cylindrical member 36 to the fourth cylindrical member 44 (or the transmission shaft 42).

Figure 2:
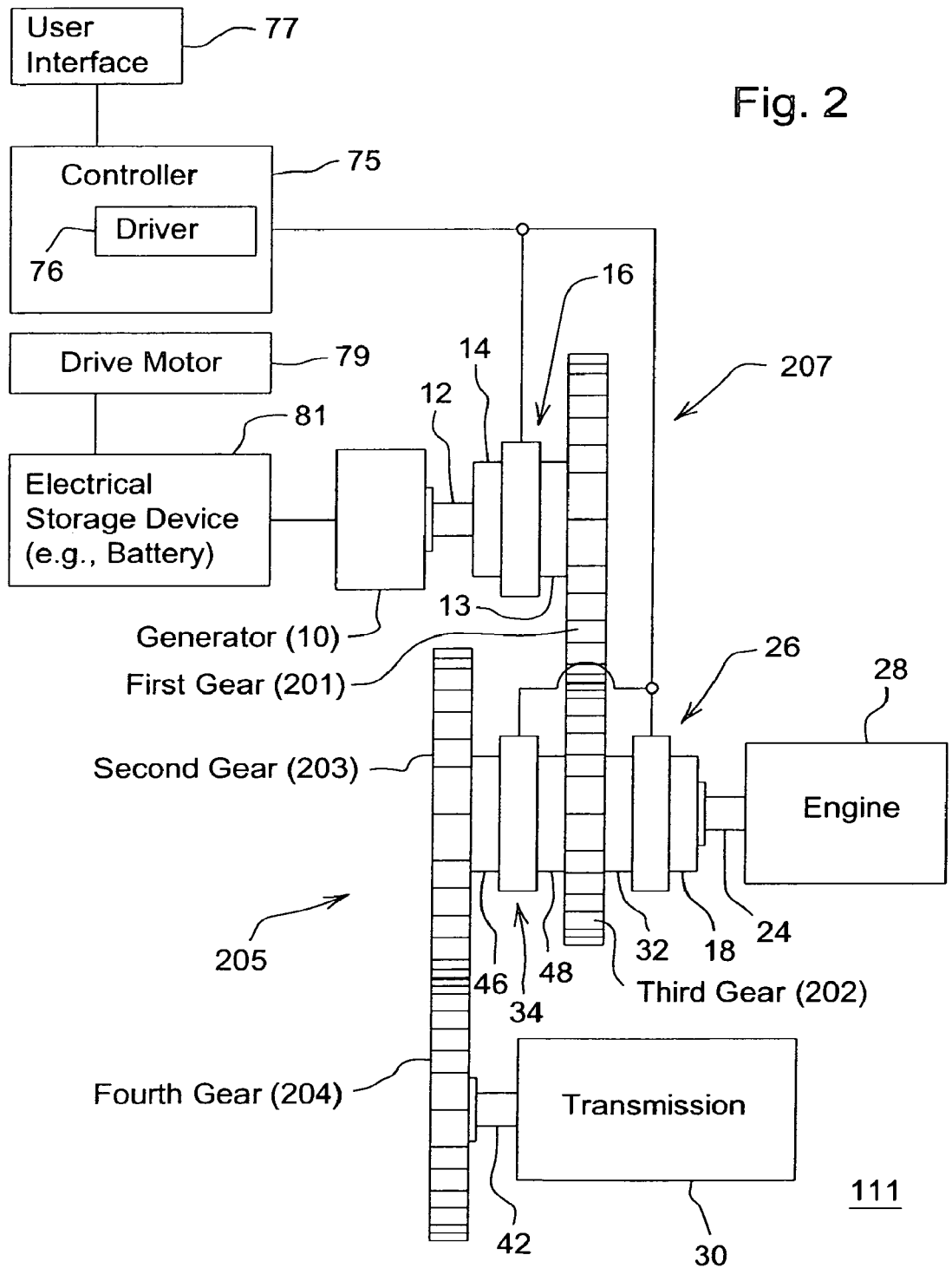
FIG. 2 is a diagram of a second embodiment of a control system for a vehicle.

The control system 111 of FIG. 2 is generally similar to the control system 11 of FIG. 1, except the control system 111 of FIG. 2 replaces the pulleys and belts combinations or chain and sprocket combinations of FIG. 1 with gear assemblies (205, 207). Each gear assembly comprises the combination of two engaging gears.

In FIG. 2, the first cylindrical member comprises a first gear 201; the third cylindrical member comprises a third gear 202; the second cylindrical member comprises a second gear 203; and the fourth cylindrical member comprises fourth gear 204. The first gear 201 engages the third gear 202 for mutual rotation therewith. The second gear 203 engages a fourth gear 204 (or transmission gear, which is associated with the transmission shaft 42) for mutual rotation therewith.

In an alternate embodiment, the first clutch assembly 16, the second clutch assembly 34, and the third clutch assembly 26, and the first gear 201, second gear 203, third gear 202, and fourth gear 204 are arranged to form a mode control gearbox 31. For example, the mode control gearbox 31 and the transmission 30 may be combined in an integral housing 33.

Figure 3:
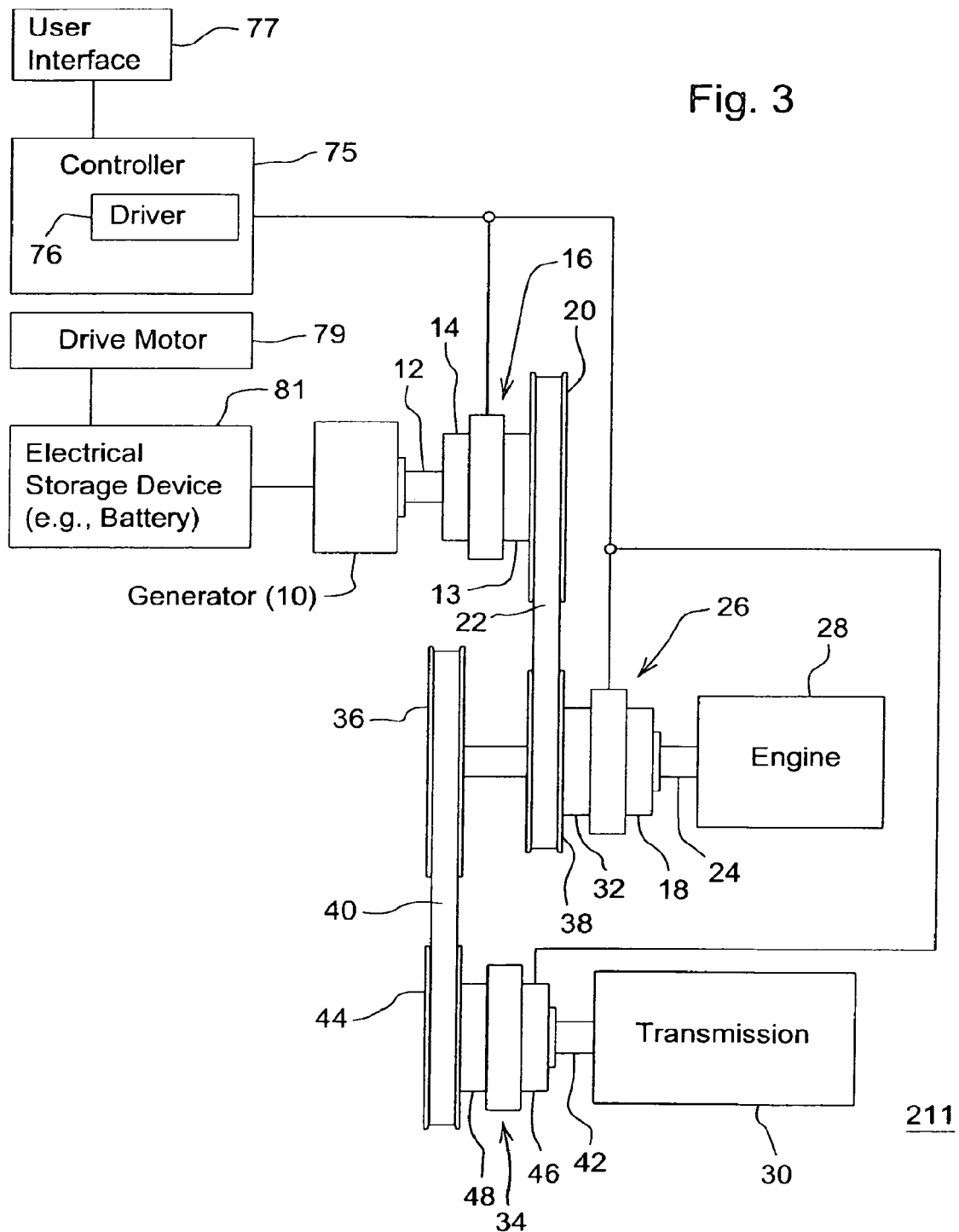
FIG. 3 is a diagram of a third embodiment of a control system for a vehicle.

The control system 211 of FIG. 3 is generally similar to the control system 11 of FIG. 1, except the second clutch assembly 34 is coupled to a transmission shaft 42, instead of the third cylindrical member 38 or the third clutch assembly 26. Further, in the configuration of FIG. 3, the second input member 48 of the second clutch assembly 34 is connected to the fourth cylindrical member 44 and the second cylindrical member 36 is coupled or connected to the third cylindrical member 38. In both FIG. 1 and FIG. 3, the second clutch assembly 34 couples or decouples the engine shaft 24 to the transmission shaft 42. In other words, the second clutch assembly 34 determines whether or not rotational energy is transmitted between the engine shaft 24 and the transmission shaft 42. In FIG. 3, if the second clutch assembly 34 is in an inactive state, the fourth cylindrical member 44 (e.g., fourth pulley) may rotate freely without conveying rotational energy to the transmission input shaft 42.

Figure 4:
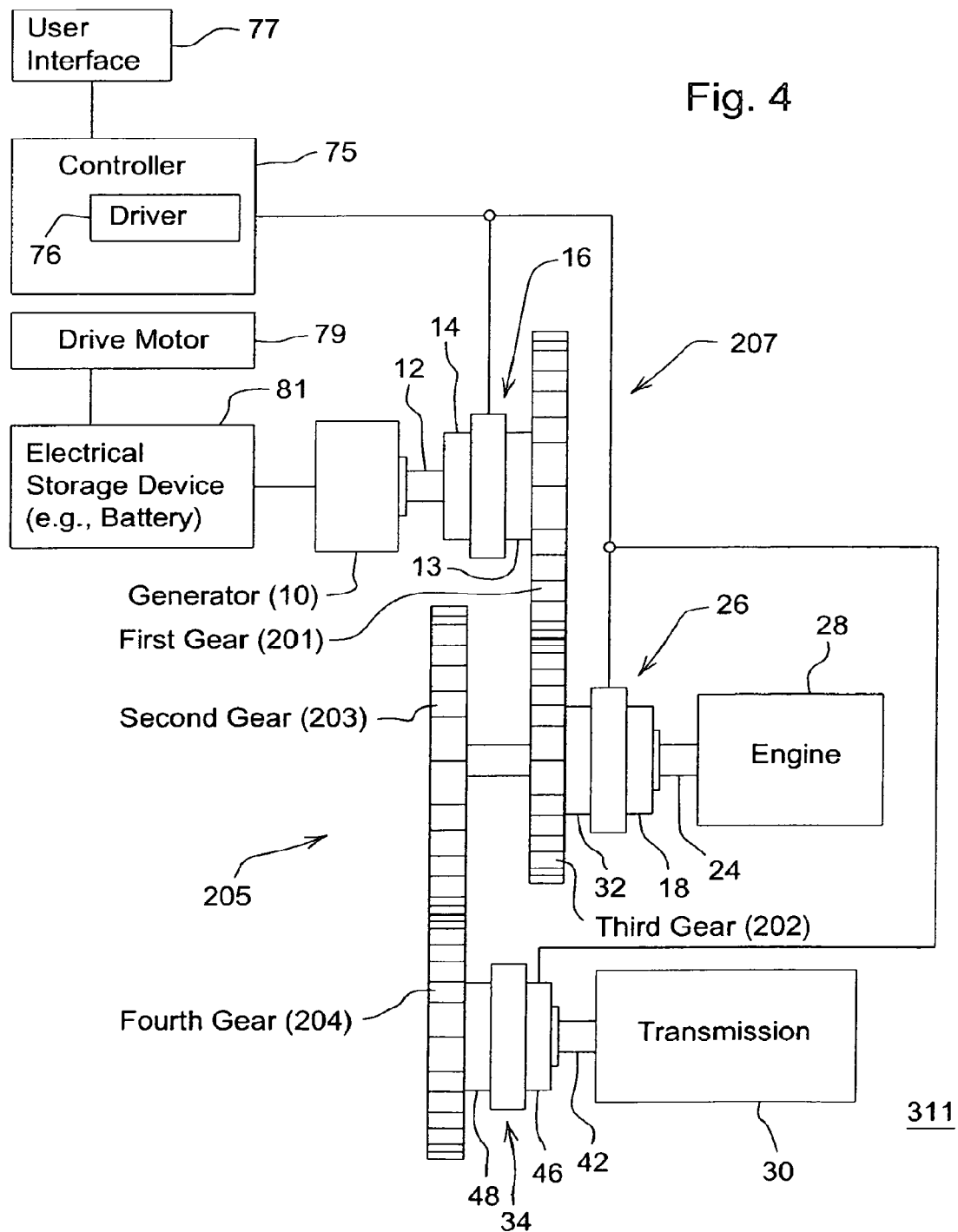
FIG. 4 is a diagram of a fourth embodiment of a control system for a vehicle.

The control system 311 of FIG. 4 is generally similar to the control system 211 of FIG. 3, except the control system 211 of FIG. 4 replaces the pulleys and belt combinations or chain and sprocket combinations of FIG. 3 with gear assemblies.

Each gear assembly comprises the combination of two engaging gears. In FIG. 4, the first cylindrical member comprises a first gear 201; the third cylindrical member comprises a third gear 202; the second cylindrical member comprises a second gear 203; and the fourth cylindrical member comprises a fourth gear 204. The first gear 201 engages the third gear 202 for mutual rotation therewith. The second gear 203 engages the fourth gear 204 (or transmission gear, which is associated with the transmission shaft 42) for mutual rotation therewith.

In an alternate embodiment, the first clutch assembly 16, the second clutch assembly 34, and the third clutch assembly 26, and the first gear 201, second gear 203, third gear 202, and fourth gear 204 are arranged to form a mode control gearbox. For example, the mode control gearbox and the transmission 30 may be combined in an integral housing (not shown).

Figure 5:
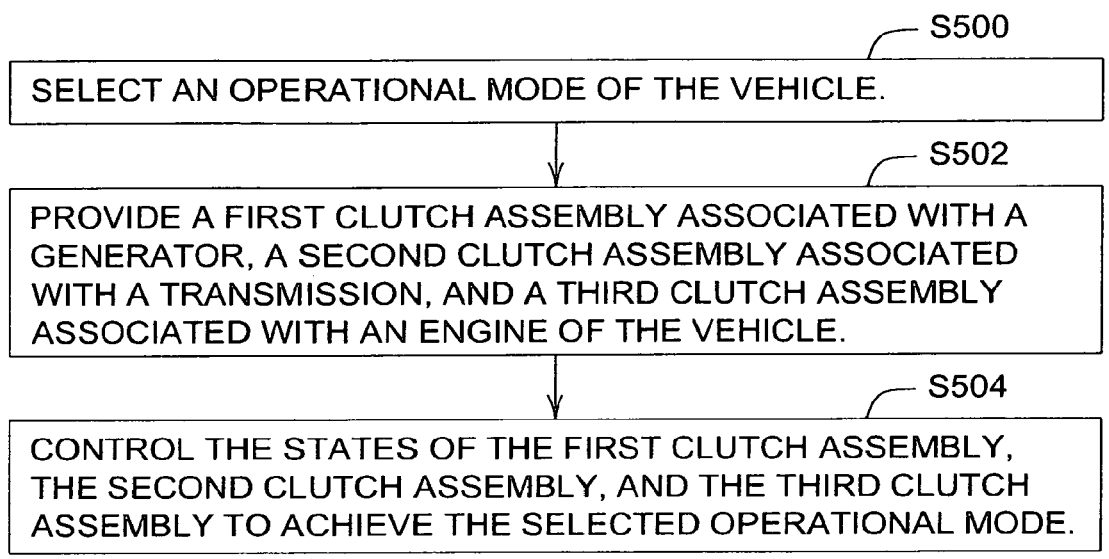
FIG. 5 is a flow chart of a method for controlling the control system.

FIG. 5 describes a method for controlling a vehicle. The method of FIG. 5 begins in step S500.

In step S500, a controller 75 or operator selects an operational mode of the vehicle. The method of step S500 may be carried out in accordance with various techniques, that may be applied separately or cumulatively. Under a first technique, the operator may operate a user interface, a switch, a pedal-operated switch, a keyboard, a keypad, a pointing device (e.g., an electronic mouse) to select a mode of operation, such as a parallel hybrid mode, a series hybrid mode, a stationary power generation mode, a conventional internal combustion mode, or another operational mode.

In step S502, a first clutch assembly 16 associated with a generator 10 is provided, a second clutch assembly 34 associated with a transmission 30 is provided, and a third clutch assembly 26 associated with an engine 28 of the vehicle is provided. For example, a first output shaft 14 of the first clutch assembly 16 may be connected to a generator shaft 12 of the generator 10; a second output member 46 of the second clutch assembly 34 is coupled to a transmission shaft 42; and a third input member 18 of the third clutch assembly 26 is coupled to an engine shaft 24, consistent with FIG. 1.

In step S504, the controller 75 controls the states of the first clutch assembly 16, the second clutch assembly 34, and the third clutch assembly 26 to achieve the selected operational mode. In a first example, the selected operational mode comprises a first operational mode (e.g., series hybrid mode or stationary power generation mode) in which the engine 28 supplies rotational energy to the generator 10 for power generation, and wherein the controlling comprises generating control signals such that the first clutch assembly 16 is active, the second clutch assembly 34 is inactive, and the third clutch assembly 26 is active. In the first operational mode, the vehicle may be propelled by one or more drive motors 79 that are fed directly or indirectly from the electrical energy generated by the generator 10. In a second example, the selected operational mode comprises a second operational mode (e.g., conventional internal combustion engine mode) in which the engine 28 supplies rotational energy to the transmission 30, wherein the controlling comprises generating control signals such that the first clutch assembly 16 is inactive, the second clutch assembly 34 is active, and the third clutch assembly 26 is active. In an alternative version of the second operational mode, the first clutch assembly 16 may be active (or may vary between an active and inactive state) such that a generator recharges an electrical storage device 81. In a third example, the selected operational mode comprises a third operational mode (e.g., parallel hybrid mode) in which propulsion may be provided by rotational energy from the engine 28 and by rotational energy from a motor coupled to the generator 10, and wherein the controlling comprises generating control signals such that the first clutch assembly 16 is active, the second clutch assembly 34 is active, and the third clutch assembly 26 is active.

Having described the preferred embodiment, it will become apparent that various modifications can be made without departing from the scope of the invention as defined in the accompanying claims.

The following is claimed:

1. A control system for a vehicle comprising:
a first clutch assembly having an active state for transmitting rotational energy and an inactive state for not transmitting rotational energy;
a generator having a generator shaft associated with the first clutch assembly;
a second clutch assembly having an active state for transmitting rotational energy and an inactive state for not transmitting rotational energy;
a transmission having a transmission shaft associated with the second clutch assembly;
a third clutch assembly having an active state for transmitting rotational energy and an inactive state for not transmitting rotational energy;
an engine having an engine shaft associated with the third clutch assembly; and
a controller for establishing an operational mode of the vehicle by controlling states of the first clutch assembly, the second clutch assembly, and the third clutch assembly using control data, wherein the control data is inputted by a user of the vehicle via a user interface coupled to the controller to control a state of at least one of the first clutch assembly, the second clutch assembly, and the third clutch assembly, and wherein the user interface receives the control data from the user to select the operational mode of the vehicle.

2. The control system according to claim 1 wherein the operational mode comprises a first operational mode in which the engine supplies rotational energy to the generator for power generation where the controller generates control signals such that the first clutch assembly is active, the second clutch assembly is inactive, and the third clutch assembly is active.

3. The control system according to claim 1 wherein the operational mode comprises a second operational mode in which the engine supplies rotational energy to the transmission where the controller generates control signals such that the first clutch assembly is inactive, the second clutch assembly is active, and the third clutch assembly is active.

4. The control system according to claim 1 wherein the operational mode comprises a third operational mode in which propulsion is provided by rotational energy from the engine and by rotational energy from a motor coupled to the generator where the controller generates control signals such that the first clutch assembly is active, the second clutch assembly is active, and the third clutch assembly is active.

5. The control system according to claim 1 wherein the first clutch assembly is mechanically coupled to the generator, wherein the second clutch assembly is mechanically coupled to the transmission; and wherein the third clutch assembly is mechanically coupled to the engine.

6. The control system according to claim 1 wherein the first clutch assembly, the second clutch assembly, and the third clutch assembly comprise electromagnetic clutches.

7. The control system according to claim 1 wherein the first clutch assembly comprises a first input member and a first output member, the second clutch assembly comprises a second input member and a second output member, and the third clutch assembly comprises a third input member and a third output member, and wherein the first input member is connected to a first cylindrical member, the second output member is connected to a second cylindrical member, and the third output member is coupled to a third cylindrical member; and further comprising a tension member for rotational coupling the first cylindrical member to the third cylindrical member and for rotational coupling the second cylindrical member to at least one of a fourth cylindrical member and a transmission shaft.

8. The control system according to claim 7 wherein the first input member is connected to a first gear, the second output member is connected to a second gear, and the third output member is connected to a third gear; the first gear engaging the third gear, the second gear engaging a fourth gear, and wherein the fourth gear is associated with the transmission shaft.

9. The control system according to claim 8 wherein the first clutch assembly, the second clutch assembly, and the third clutch assembly, and the first gear, second gear, third gear, and fourth gear are arranged to form a mode control gearbox.

10. The control system according to claim 9 wherein the mode control gearbox and the transmission are combined in an integral housing.

11. The control system according to claim 7 wherein the first input member is connected to a first sprocket, the second output member is connected to a second sprocket, and the third output member is connected to a third sprocket; and further comprising chains for rotational coupling the first sprocket to the third sprocket and for rotational coupling the second sprocket to at least one of a fourth sprocket and the transmission shaft.

12. A method for controlling a vehicle, the method comprising:
selecting an operational mode of the vehicle using control data to form a selected operational mode;
providing a first clutch assembly associated with a generator, a second clutch assembly associated with a transmission, and a third clutch assembly associated with an engine of the vehicle; and
controlling states of the first clutch assembly, the second clutch assembly, and the third clutch assembly to achieve the selected operational mode using the control data, wherein the control data is inputted by a user of the vehicle via a user interface coupled to the controller to control a state of at least one of the first clutch assembly, the second clutch assembly, and the third clutch assembly, and wherein the user interface receives the control data from the user to select the operational mode of the vehicle.

13. The method according to claim 12 wherein the selected operational mode comprises a first operational mode in which the engine supplies rotational energy to the generator for power generation, and wherein the controlling comprises generating control signals such that the first clutch assembly is active, the second clutch assembly is inactive, and the third clutch assembly is active.

14. The method according to claim 12 wherein the selected operational mode comprises a second operational mode in which the engine supplies rotational energy to the transmission, wherein the controlling comprises generating control signals such that the first clutch assembly is inactive, the second clutch assembly is active, and the third clutch assembly is active.

15. The method according to claim 12 wherein the selected operational mode comprises a third operational mode in which propulsion is provided by rotational energy from the engine and by rotational energy from a motor coupled to the generator, and wherein the controlling comprises generating control signals such that the first clutch assembly is active, the second clutch assembly is active, and the third clutch assembly is active.

16. The method according to claim 12 wherein the first clutch assembly comprises a first input member and a first output member, the first clutch assembly having an active state in which rotational energy is transmitted between the first input member and the first output member and an inactive state in which rotational energy is not transmitted between the first input member and the first output member;
the second clutch assembly comprising a second input member and a second output member, the second clutch assembly having an active state in which rotational energy is transmitted between the second input member and the second output member and an inactive state in which rotational energy is not transmitted between the second input member and the second output member; and
the third clutch assembly comprising a third input member and a third output member, the third clutch assembly having an active state in which rotational energy is transmitted between the third input member and the third output member and an inactive state in which rotational energy is not transmitted between the third input member and the third output member.

17. The method according to claim 16 wherein the first output member of the first clutch assembly is mechanically transmitted to the generator, wherein the second output member of the second clutch assembly is mechanically transmitted to the transmission; and wherein the third input of the third clutch assembly is mechanically coupled to the engine.

18. The method according to claim 12 wherein the first clutch assembly comprises a first input member and a first output member, the second clutch assembly comprises a second input member and a second output member, and the third clutch assembly comprises a third input member and a third output member, and wherein the first input member is connected to a first cylindrical member, the second output member is connected to a second cylindrical member, and the third output member is coupled to a third cylindrical member; and further comprising a tension member for rotational coupling the first cylindrical member to the third cylindrical member and for rotational coupling the second cylindrical member to at least one of a fourth cylindrical member and a transmission shaft.

19. The method according to claim 18 wherein the first input member is connected to a first gear, the second output member is connected to a second gear, and the third output member is connected to a third gear; the first gear engaging the third gear, the second gear engaging a fourth gear, and wherein the fourth gear is associated with the transmission shaft.

20. The method according to claim 19 wherein the first clutch assembly, the second clutch assembly, and the third clutch assembly, and the first gear, second gear, third gear, and fourth gear are arranged to form a mode control gearbox, and wherein the mode control gearbox and the transmission are combined in an integral housing.

* * * * *